US009861921B2

(12) United States Patent
Hemstock et al.

(10) Patent No.: US 9,861,921 B2
(45) Date of Patent: Jan. 9, 2018

(54) DESANDING APPARATUS AND A METHOD OF USING THE SAME

(71) Applicant: SPECIALIZED DESANDERS INC., Calgary (CA)

(72) Inventors: Christopher Hemstock, Calgary (CA); Warren Kmicik, St. Albert (CA)

(73) Assignee: Specialized Desanders Inc., Calgary (CA)

( * ) Notice: Subject to any disclaimer, the term of this patent is extended or adjusted under 35 U.S.C. 154(b) by 223 days.

(21) Appl. No.: 14/561,386

(22) Filed: Dec. 5, 2014

(65) Prior Publication Data

US 2015/0165358 A1    Jun. 18, 2015

Related U.S. Application Data

(60) Provisional application No. 62/087,604, filed on Dec. 4, 2014.

(30) Foreign Application Priority Data

Dec. 16, 2013   (CA) ..................................... 2836437

(51) Int. Cl.
*B01D 19/00*       (2006.01)
*B01D 45/08*       (2006.01)
(Continued)

(52) U.S. Cl.
CPC ............. *B01D 45/08* (2013.01); *B01D 45/12* (2013.01); *B04C 5/04* (2013.01); *B04C 5/103* (2013.01); *B04C 5/13* (2013.01)

(58) Field of Classification Search
CPC ............................ B01D 45/00–45/18; B01D 21/0039–21/0075; B01D 19/0057;
(Continued)

(56) References Cited

U.S. PATENT DOCUMENTS 1,494,670 A    5/1924    Delaney
1,535,721 A    4/1925    Gill
(Continued)

FOREIGN PATENT DOCUMENTS

CA          2041479       4/1998
CA          2433741       7/2003
(Continued)

OTHER PUBLICATIONS

PCT/CA2014/050712 International Search Report and Written Opinion.
(Continued)

*Primary Examiner* — T. Bennett McKenzie
(74) *Attorney, Agent, or Firm* — Parlee McLaws LLP; Sean W. Goodwin

(57) ABSTRACT

An apparatus and method for removing particulates from a multiple-phase fluid stream is disclosed. The apparatus has a vessel enclosed by walls, and the vessel has a fluid inlet for receiving the multiple-phase fluid stream, a fluid outlet spacing from the fluid inlet for discharging gas phase matter, and a passage, such as a spiral path, in the vessel extending from the fluid inlet to the fluid outlet. The length of the passage is longer than the distance between the fluid inlet and the fluid outlet.

22 Claims, 10 Drawing Sheets

(51) Int. Cl.
  *B01D 45/12* (2006.01)
  *B04C 5/04* (2006.01)
  *B04C 5/103* (2006.01)
  *B04C 5/13* (2006.01)

(58) Field of Classification Search
  CPC ............... B04C 1/00; B04C 3/00–3/06; B04C 5/00–5/30; B04C 7/00; B04C 9/00; B04C 2009/001–2009/008; B04C 11/00; A47L 9/16–9/1691; E21B 43/34–43/40
  USPC ............... 95/269, 267; 55/456, 462
  See application file for complete search history.

(56) References Cited

U.S. PATENT DOCUMENTS

| | | | |
|---|---|---|---|
| 1,601,611 A | 9/1926 | Downey | |
| 1,702,612 A | 2/1929 | Morse | |
| 1,851,030 A | 3/1932 | Adams | |
| 1,863,111 A * | 6/1932 | Greve | B01D 19/0057 96/216 |
| 2,049,068 A | 7/1936 | Loupe | |
| 2,058,044 A | 10/1936 | Spencer | |
| 2,206,835 A | 7/1940 | Combs | |
| 2,228,401 A | 1/1941 | Pressler | |
| 2,547,190 A | 4/1951 | Wilson | |
| 2,610,697 A | 9/1952 | Lovelady | |
| 2,664,963 A | 1/1954 | Lovelady | |
| 2,706,531 A | 4/1955 | Lovelady | |
| 2,751,998 A | 6/1956 | Glasgow | |
| 3,255,571 A | 6/1966 | Walker et al. | |
| 3,273,318 A | 9/1966 | Meyer | |
| 3,310,109 A | 3/1967 | Marx | |
| 3,331,188 A | 7/1967 | Sinex | |
| 3,396,512 A | 8/1968 | McMinn | |
| 3,426,904 A | 2/1969 | Katsua | |
| 3,553,940 A | 1/1971 | Piner, Jr. | |
| 3,574,096 A | 4/1971 | Carlstedt | |
| 3,852,192 A | 12/1974 | Fassell | |
| 4,073,734 A | 2/1978 | Lowrie | |
| 4,115,279 A | 9/1978 | Toft | |
| 4,122,009 A | 10/1978 | Tao | |
| 4,208,196 A | 6/1980 | Coggins | |
| 4,238,333 A | 12/1980 | Tidwell | |
| 4,257,895 A | 3/1981 | Murdock | |
| 4,348,215 A * | 9/1982 | Dehne | B04C 5/28 209/711 |
| 4,400,271 A | 8/1983 | Lunceford | |
| 4,539,023 A | 9/1985 | Boley | |
| 4,604,196 A | 8/1986 | Lowrie et al. | |
| 4,617,031 A | 10/1986 | Suh | |
| 4,673,500 A | 6/1987 | Hoofnagle et al. | |
| 4,721,565 A | 1/1988 | Carroll | |
| 4,778,494 A | 10/1988 | Patterson | |
| 4,939,817 A | 7/1990 | Weber | |
| 4,975,205 A | 12/1990 | Sloan | |
| 5,064,448 A | 11/1991 | Choi | |
| 5,173,194 A | 12/1992 | Hering | |
| 5,245,057 A | 9/1993 | Shirtum | |
| 5,295,537 A | 3/1994 | Trainer | |
| 5,326,474 A | 7/1994 | Adams et al. | |
| 5,415,776 A | 5/1995 | Homan | |
| 5,500,039 A | 3/1996 | Mori | |
| 5,522,999 A | 6/1996 | Broussard | |
| 5,575,909 A | 11/1996 | Foster | |
| 5,582,271 A | 12/1996 | Mielo | |
| 5,599,507 A | 2/1997 | Shaw | |
| 5,827,357 A | 10/1998 | Farion | |
| 5,865,992 A | 2/1999 | Edmondson | |
| 5,900,137 A | 5/1999 | Homan | |
| 5,928,519 A | 7/1999 | Homan | |
| 6,099,743 A | 8/2000 | Pedersen | |
| 6,119,779 A | 9/2000 | Gipson et al. | |
| 6,158,512 A | 12/2000 | Unsgaard | |
| 6,189,617 B1 | 2/2001 | Sorhus et al. | |
| 6,214,092 B1 | 4/2001 | Odom et al. | |
| 6,214,220 B1 | 4/2001 | Favret | |
| 6,269,880 B1 | 8/2001 | Landry | |
| 6,409,808 B1 | 6/2002 | Chamberlain | |
| 6,419,730 B1 | 7/2002 | Chavez | |
| 6,458,191 B1 * | 10/2002 | Lingelem | E21B 43/34 96/209 |
| 6,537,458 B1 | 3/2003 | Polderman | |
| 6,783,683 B2 | 8/2004 | Collings | |
| 6,821,322 B2 | 11/2004 | Milia | |
| 6,983,852 B2 | 1/2006 | Hemstock et al. | |
| 7,429,332 B2 | 9/2008 | Surjaatmadja et al. | |
| 7,614,389 B2 | 11/2009 | Ruckwied | |
| 7,785,400 B1 | 8/2010 | Worley | |
| 8,308,959 B2 | 11/2012 | Noles, Jr. | |
| 8,337,603 B2 | 12/2012 | Akhras et al. | |
| 8,623,221 B1 | 1/2014 | Boyd et al. | |
| 2002/0162806 A1 | 11/2002 | Komistek | |
| 2003/0154860 A1 * | 8/2003 | Milia | B01D 19/0057 95/261 |
| 2004/0074838 A1 | 4/2004 | Hemstock et al. | |
| 2004/0184976 A1 | 9/2004 | Pagani | |
| 2007/0131454 A1 * | 6/2007 | Hollier | E21B 21/066 175/66 |
| 2011/0078987 A1 | 4/2011 | Shishov et al. | |
| 2011/0199855 A1 | 8/2011 | Hanada | |

FOREIGN PATENT DOCUMENTS

| | | |
|---|---|---|
| CA | 2407554 | 4/2004 |
| CA | 2646150 | 6/2009 |
| CA | 2799278 | 8/2013 |
| EP | 0208981 B1 | 3/1991 |
| GB | 773096 | 4/1957 |
| GB | 1048873 | 11/1966 |
| JP | 2005-074362 | 3/2003 |
| JP | 2012-139681 | 12/2012 |
| WO | 2002063231 | 8/2002 |
| WO | 2002070101 | 9/2002 |
| WO | 2009055291 | 4/2009 |
| WO | 2010034325 | 4/2010 |
| WO | 2013016952 | 2/2013 |
| WO | WO 2015/089652 A1 | 6/2015 |

OTHER PUBLICATIONS

PCT/CA2015/051266 International Search Report and Written Opinion.
PCT/CA2012/050915—International Search Report.
PCT/CA2014/051170 International Search Report and Written Opinion.
JP,2005-0743862,A—English Translation, Japanese Patent Office.
JP,2012-139681,A—English Translation, Japanese Patent Office.

* cited by examiner

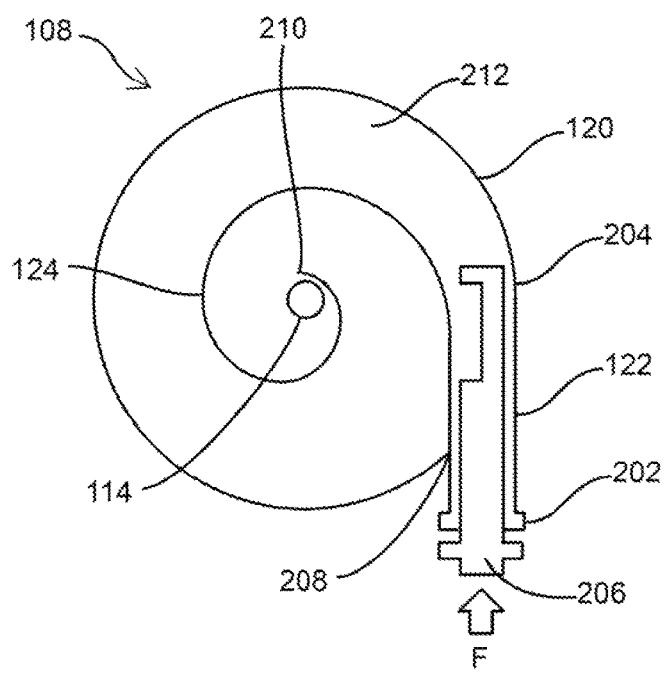
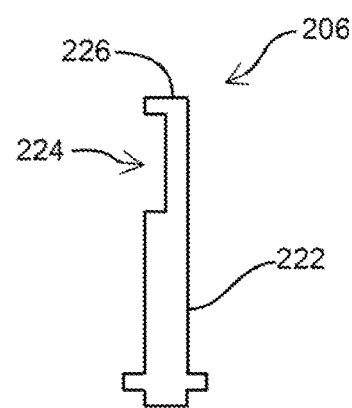
FIG. 3A
FIG. 4
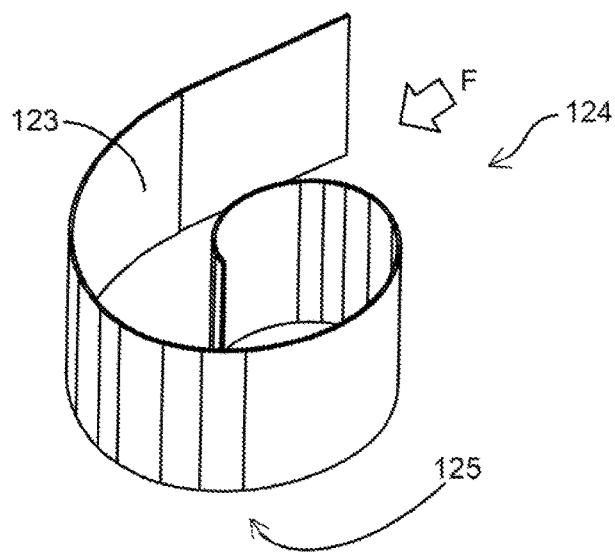
FIG. 3B

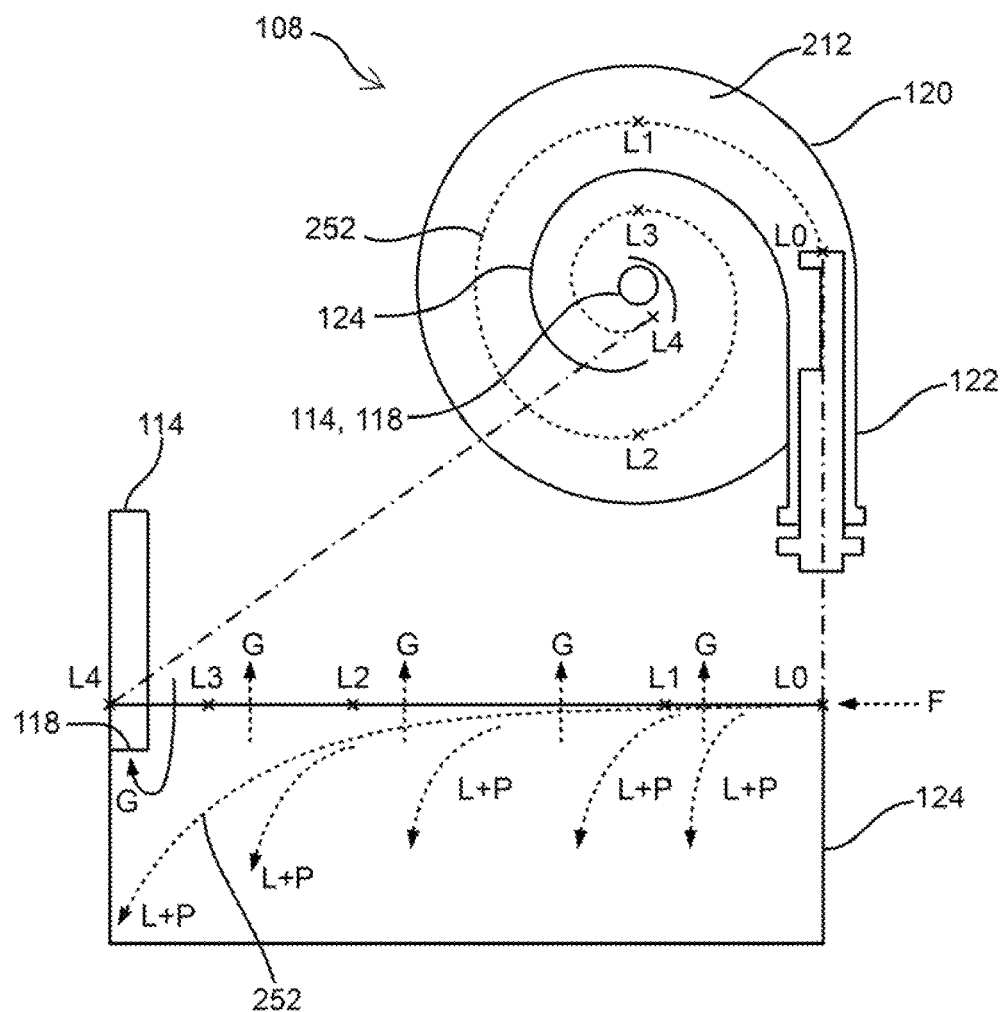

DESANDING APPARATUS AND A METHOD OF USING THE SAME

FIELD OF THE DISCLOSURE

The present disclosure generally relates to an apparatus and a method for removing particulates from multiphase fluid streams, and in particular, relates to an apparatus and a method for removing sands from multiphase fluid streams produced from an oil or gas well while minimizing the abrasion to the equipment involved.

BACKGROUND

Production from wells in the oil and gas industry often contains particulates such as sand. These particulates could be part of the formation from which the hydrocarbon is being produced, introduced from hydraulic fracturing, or fluid loss material from drilling mud or fracturing fluids, or from a phase change of produced hydrocarbons caused by changing conditions at the wellbore (Asphalt or wax formation). As the particulates are produced, problems occur due to abrasion and plugging of production equipment. In a typical startup after stimulating a well by fracturing, the stimulated well may produce sand until the well has stabilized, often lasting for several months after production commences. Other wells may produce sand for a much longer period of time.

Erosion of the production equipment is severe enough to cause catastrophic failure. High fluid stream velocities are typical and are even purposefully designed for elutriating particles up the well and to the surface. An erosive failure of this nature can become a serious safety and environmental issue for the well operator. A failure such as a breach of high pressure piping or equipment releases uncontrolled high velocity flow of fluid which is hazardous to service personnel. Releasing such fluid to the environment is damaging to the environment resulting in expensive cleanup and loss of production. Repair costs are also high.

In all cases, retention of particulates contaminates surface equipment and the produced fluids and impairs the normal operation of the oil and gas gathering systems and process facilities. Therefore, desanding devices are required for removing sand from the fluid stream. Due to the nature of the gases handled, including pressure and toxicity, all vessels and pressure piping in desanding devices must be manufactured and approved by appropriate boiler and pressure vessel safety authorities.

In one existing system, a pressurized tank ("P-Tank") is placed on the wellsite and the well is allowed to produce fluid and particulates. The fluid stream is produced from a wellhead and into a P-Tank until sand production ceases. The large size of the P-Tank usually restricts the maximum operating pressure of the vessel to something in the order of 1,000-2,100 kPa. In the case of a gas well, this requires some pressure control to be placed on the well to protect the P-Tank. Further, for a gas well, a pressure reduction usually is associated with an increase in gas velocity which in turn makes sand-laden wellhead effluent much more abrasive and places the pressure controlling choke at risk of failure. Another problem associated with this type of desanding technique is that it is only a temporary solution. If the well continues to make sand, the solution becomes prohibitively expensive. In most situations with this kind of temporary solution, the gas vapors are not conserved and sold as a commercial product.

Another known system includes employing filters to remove particulates. A common design is to have a number of fiber-mesh filter bags placed inside a pressure vessel. The density of the filter bag fiber-mesh is matched to the anticipated size of the particulates. Filter bags are generally not effective in the removal of particulates in a multiphase condition. Usually multiphase flow in the oil and gas operations is unstable. Large slugs of fluid followed by a gas mist are common. In these cases, the fiber bags become a cause of pressure drop and often fail due to the liquid flow there through. Due to the high chance of failure, filter bags may not be trusted to remove particulates in critical applications or where the flow parameters of a well are unknown. An additional problem with filter bags in most jurisdictions is the cost associated with disposal. The fiber-mesh filter bags are considered to be contaminated with hydrocarbons and must be disposed of in accordance to local environmental regulation.

Hydrocylone or cyclone devices are also known for separating particles from liquid mixture by exploiting the centripetal force. By injecting the liquid mixture into a vessel and spinning therein, heavy or large particles move outward towards the wall of the vessel due to the centripetal force, and spirally move down to the bottom of the vessel. Light components move towards the center of the vessel and may be discharged via an outlet. However, Hydrocylone devices have difficulty in separating particulates from effluents with more than two phases, and have an associated pressure drop issue that is undesirable in many oilfield situations.

In Canadian Patent Number 2,433,741, issued Feb. 3, 2004, and in Canadian Patent Number 2,407,554, issued Jun. 20, 2006, both assigned to the Applicant of the subject patent application, a desander is disclosed having an elongate, horizontal vessel with an inlet at one end and an outlet at the other end. As shown in FIG. 1, the desander 10 comprises a cylindrical pressure vessel 11 having a substantially horizontal axis A, a first fluid inlet end 12 adapted for connection to the fluid stream F. The fluid stream F typically comprises a variety of phases including gas G, some liquid L and entrained particulates P such as sand. The fluid stream F containing sand enters through the inlet end 12 and is received by a freeboard portion 13. The freeboard area is set by a downcomer flow barrier, or a weir, 14. Accordingly, the velocity of the fluid stream F slows to a point below the entrainment or elutriation velocity of at least a portion of the particulates P in the fluid stream. Given sufficient horizontal distance without interference, the particulates P eventually fall from the freeboard portion 13. Particulates P and liquids L accumulate over time in the belly portion 15, and the desanded fluid stream, typically liquid L and gas G, emanates from fluid outlet 16.

The accumulated particulates in the vessel require periodical clean-out at sufficient intervals to ensure that the maximum accumulated depth does not encroach on the fluid outlet 16. However, for larger vessels, manual cleaning becomes difficult and time consuming.

While the desanding device disclosed in above Canadian patents has been a great success over the past 11 years or so, improvements are possible. Canadian Patent Application Number 2,799,278, filed on Dec. 19, 2012, and assigned to the Applicant of the subject application, discloses a desander device having a tilted vessel to remove the need for a downcomer flow barrier. However, this desander requires the vessel to be depressurized to remove sand causing downtime and in some cases a hazard for workers as the effluent can contain toxic substances.

Therefore, there continues to exist the desire of further improving the ease with which the vessel can be cleaned and the desire of further improvement in separation efficiency.

SUMMARY

It is an objective of this disclosure to provide a desanding device for removing particulates from a fluid stream.

According to one aspect, a pressurized vessel is provided for receiving a high velocity fluid stream from a field piping extending from a wellhead. The vessel removes particulates from the received fluid stream and discharges the desanded fluid stream to downstream equipment.

According to another aspect, this disclosure discloses a vessel for removing at least particulates from a multiple-phase fluid stream containing at least gas and entrained particulates. The vessel comprises: a fluid inlet for discharging the fluid stream into the vessel; a fluid outlet comprising an intake opening in the vessel and a discharge opening for discharging a desanded gas stream out of the vessel; and an internal baffle for receiving the fluid stream from the fluid inlet and directing the fluid stream generally horizontally along an elongated flow path from the fluid inlet to the fluid outlet, the baffle having an open top at an elevation above the fluid inlet and an open bottom at an elevation below the fluid inlet; wherein the intake opening of the fluid outlet is within the baffle at an elevation below the top opening of the baffle.

In one embodiment, the internal baffle is a generally upright spiral plate and the elongated flow path is a spiral flow path along the spiral plate.

In another embodiment, the cross-sectional shape of the internal baffle is selected from the group consisting of an Archimedean spiral, a Cornu spiral, a Fermat's spiral, a hyperbolic spiral, a lituus, a logarithmic spiral, and a spiral of Theodorus.

In another embodiment, the fluid inlet is oriented generally horizontally for directing the fluid stream along the internal baffle.

In another embodiment, the vessel comprises a cylindrical side wall, and the fluid inlet is oriented for directing the fluid stream at a direction tangential to the side wall.

In another embodiment, the fluid inlet directs the fluid stream away from the side wall of the vessel.

In another embodiment, the fluid inlet is at an elevation above the intake opening of the fluid outlet.

In another embodiment, the fluid inlet is at an elevation below the intake opening of the fluid outlet.

In another embodiment, the vessel further comprises: a drain at a lower portion of the vessel for removal of particulates from the vessel.

In another embodiment, the lower portion of the vessel comprises at least one inclined side wall for facilitating flow entrained particulates to migrate towards the drain.

In another embodiment, the slope of the at least one inclined side wall is about or greater than the angle of repose of a bank of wet particulates.

In another embodiment, the drain further comprises: an inlet valve adjacent and fluidly connected to the drain; a particulate accumulation chamber; and a discharge valve, wherein the particulate accumulation chamber is sandwiched between the inlet valve and the discharge valve.

In another embodiment, the multiple-phase fluid stream further comprises liquid, and wherein an effective amount of the entrained liquids and particulates fall through the open bottom of the internal baffle.

In another embodiment, the intake opening of the fluid outlet determines a horizontally extending freeboard interface, the freeboard interface separating a freeboard portion formed adjacent an upper portion of the vessel above the interface and an accumulator portion therebelow, the freeboard portion forming a freeboard cross-sectional area for establishing a freeboard velocity of the fluid stream therein being less than a fluid stream velocity at the fluid inlet.

In another embodiment, the vessel comprises a cylindrical side wall and a flat head.

In another embodiment, the vessel comprises a cylindrical side wall and a hemispherical head.

In another embodiment, the vessel comprises a cylindrical side wall and a semi-elliptical head.

In another embodiment, the vessel further comprises: an elongated conduit having an upper opening and a lower opening; wherein at least a portion of the elongated conduit is within the baffle; wherein the intake opening of the fluid outlet is in the elongated conduit at an elevation below the upper opening of the conduit.

In another embodiment, the fluid outlet extends into the upper opening of the elongated conduit.

In another embodiment, the elongated conduit comprises a top wall, the top wall comprising an opening sealably receiving the fluid outlet, and wherein the elongated conduit further comprises one or more openings proximate the top wall thereof, forming the upper opening thereof.

In another embodiment, the upper opening of the elongated conduit is at an elevation above the top of the baffle.

In another embodiment, the upper opening of the elongated conduit is at an elevation below the top of the baffle.

In another embodiment, the lower opening of the elongated conduit is at an elevation about the same as the bottom of the baffle.

In another embodiment, the lower opening of the elongated conduit is at an elevation above the bottom of the baffle.

According to another aspect, this disclosure discloses a method of removing at least particulates from a multiple-phase fluid stream containing at least gas and particulates. The method comprises: injecting the fluid stream along a generally horizontal fluid injection direction into a vessel via a fluid inlet; directing the fluid stream along an elongated flow path in the vessel from the fluid inlet to a fluid outlet to allow at least a substantial amount of the entrained particulates fall out of the fluid stream and move into an accumulator portion, the fluid outlet being spaced laterally from the fluid injection direction, and the length of the flow path being longer than the direct distance between the fluid inlet and the fluid outlet; collecting desanded gas in a freeboard portion, the freeboard portion being above the accumulator portion and being separated therefrom by a freeboard interface; and discharging the desanded gas from the freeboard portion via the fluid outlet; wherein the desanded gas is free of a substantial portion of the particulates.

In one embodiment, said directing the fluid stream along an elongated flow path in the vessel comprises: directing the fluid stream along a spiral flow path in the vessel from the fluid inlet to the fluid outlet, desanded gas being directed along the spiral flow path to the fluid outlet and particulates fall from the freeboard portion into the accumulator portion.

In another embodiment, the multiple-phase fluid stream further comprises liquid, and wherein during said directing the fluid stream along an elongated flow path in the vessel, liquid falls from the freeboard portion into the accumulator portion.

According to another aspect, this disclosure discloses a vessel for removing at least particulates from a multiple-phase fluid stream containing at least gas and entrained particulates. The vessel comprises: a fluid inlet for receiving the fluid stream and manipulating the fluid along a generally horizontal fluid injection direction into the vessel; a fluid outlet spaced laterally from the fluid inlet, the fluid outlet comprising an intake opening in the vessel and a discharge opening outside the vessel; an internal baffle having an open top and an open bottom, the open top of the internal baffle receiving the intake opening of the fluid outlet, the internal baffle forming an elongated flow path generally about a vertical axis for receiving the fluid stream from the fluid inlet and directing the fluid stream therethrough to the fluid outlet, a length of the elongated flow path from the fluid inlet to fluid outlet being longer than the distance between the fluid inlet and the fluid outlet; and an elongated conduit having an upper opening and a lower opening, at least a portion of the elongated conduit being within the baffle, and the intake opening of the fluid outlet being in the elongated conduit at an elevation below the upper opening of the conduit; wherein the area of the cross section of the vessel at a location proximate to the fluid inlet is larger than that of the cross section of the fluid inlet; the length of the elongated flow path, the cross section of the vessel and the velocity of the multiple-phase fluid stream are such that at least a substantial amount of the entrained particulates fall out of the fluid stream and collect in a lower portion of the vessel; and wherein a desanded gas stream flows out of an upper portion of the vessel through the fluid outlet and is free of a substantial portion of the particulates.

In one embodiment, the internal baffle is a generally upright spiral plate and the elongated flow path is a spiral flow path along the spiral plate.

In another embodiment, the lower opening of the conduit is at an elevation about the same as the bottom of the internal baffle.

In another embodiment, the lower opening of the elongated conduit is at an elevation above the bottom of the baffle.

In another embodiment, the intake opening of the fluid outlet has an area lager than that of other portion of the fluid outlet.

In another embodiment, the fluid inlet is on the vessel at an elevation higher than the intake opening of the fluid outlet.

In another embodiment, the fluid inlet is oriented for directing the fluid stream along the internal baffle.

In another embodiment, the vessel comprises a cylindrical side wall, and the fluid inlet directs the fluid stream at a direction tangential to the side wall.

In another embodiment, the vessel further comprises: a particulate outlet at the lower portion of the vessel for removing particulates from the vessel.

In another embodiment, the intake opening of the fluid outlet defining a horizontally extending freeboard interface separating a freeboard portion formed adjacent an upper portion of the vessel above the interface and a accumulator portion therebelow, the freeboard portion forming a freeboard cross-sectional area for a freeboard velocity of the fluid stream less than a fluid stream velocity at the fluid inlet.

In another embodiment, a lowermost portion of the vessel comprises a conical side wall tapering to a bottom having a cross section smaller than that of other portion of the vessel.

In another embodiment, the slope of the conical wall is about or greater than the angle of repose of a bank of wet particulates.

According to another aspect, this disclosure discloses a method of removing at least particulates from a multiple-phase fluid stream containing at least gas and particulates. The method comprises: injecting, at a first fluid velocity, the fluid stream along a generally horizontal fluid injection direction into a vessel via a fluid inlet; directing, at a second fluid velocity slower than the first fluid velocity, the fluid stream along an elongated flow path in the vessel from the fluid inlet to a fluid outlet to allow at least a substantial amount of the entrained particulates fall out of the fluid stream and move into an accumulator portion, the fluid outlet being spaced laterally from the fluid injection direction, and the length of the flow path being longer than the direct distance between the fluid inlet and the fluid outlet; separating a portion of the interior space of the vessel about and below an intake end of the fluid outlet from the other portion thereof, sand separated interior space being in fluid communication with said other interior space of the vessel from an upper opening above the intake end of the fluid outlet and a lower opening below the intake end of the fluid outlet; collecting desanded gas in a freeboard portion, the freeboard portion being above the accumulator portion and being separated therefrom by a freeboard interface; directing desanded gas in the freeboard portion into the separated interior space; discharging the desanded gas from the separated interior space via the fluid outlet; wherein the desanded gas is free of a substantial portion of the particulates.

In one embodiment, said directing the fluid stream along an elongated flow path in the vessel comprises: directing the fluid stream along a spiral flow path in the vessel from the fluid inlet to the fluid outlet.

In another embodiment, the method further comprises: removing particulates accumulated in the accumulator portion.

BRIEF DESCRIPTION OF THE DRAWINGS

FIG. 3A is a cross-sectional view along section A-A of the desanding device of FIG. 2;

FIG. 3B is a perspective view of the internal baffle of the desanding device of FIG. 2;

FIG. 4 is a top plan view of a replaceable nozzle of FIG. 3A;

FIG. 5A is a simplified illustration of the flow path in the desanding device of FIG. 2;

FIG. 5B shows an "unwrapped side view" of the internal baffle of the desanding device of FIG. 2 and flow path that are "unwrapped" to a two-dimensional plane;

DETAILED DESCRIPTION

A desanding device is typically inserted between, or as a replacement for, existing piping such as connecting piping coupled to a wellhead and downstream equipment such as piping, valves, chokes, multiphase separators and other downstream equipment. As will be described in more detail later, the desanding device receives, via a fluid inlet, a multiphase fluid stream F from the wellhead, and injects the fluid stream F into a vessel. Herein, the multiphase fluid F typically comprises a variety of phases including gas G, some liquid L such as water and/or oil, and entrained particulates P such as sand.

The fluid stream F injected into the vessel is directed to go along a spiral flow path therein. Because of gravity, particulates P and liquid L fall out of the fluid stream into the lower portion of the vessel, so called an accumulator portion. Particulates-removed fluid (so called "desanded fluid"), which is mainly gas G, is accumulated in the upper portion of the vessel, so called a freeboard portion, and is discharged to downstream equipment via an outlet. The accumulator portion is separated from the freeboard portion by a freeboard interface referred to in industry as a gas/liquid interface, an interface between gas G and liquid L.

The desanding device disclosed herein is free of the prior art flow barrier, has a large freeboard upon entry of the flow stream, and reduces liquid flow rates for improving settling conditions therein and retention of captured particulates P.

Figure 2:
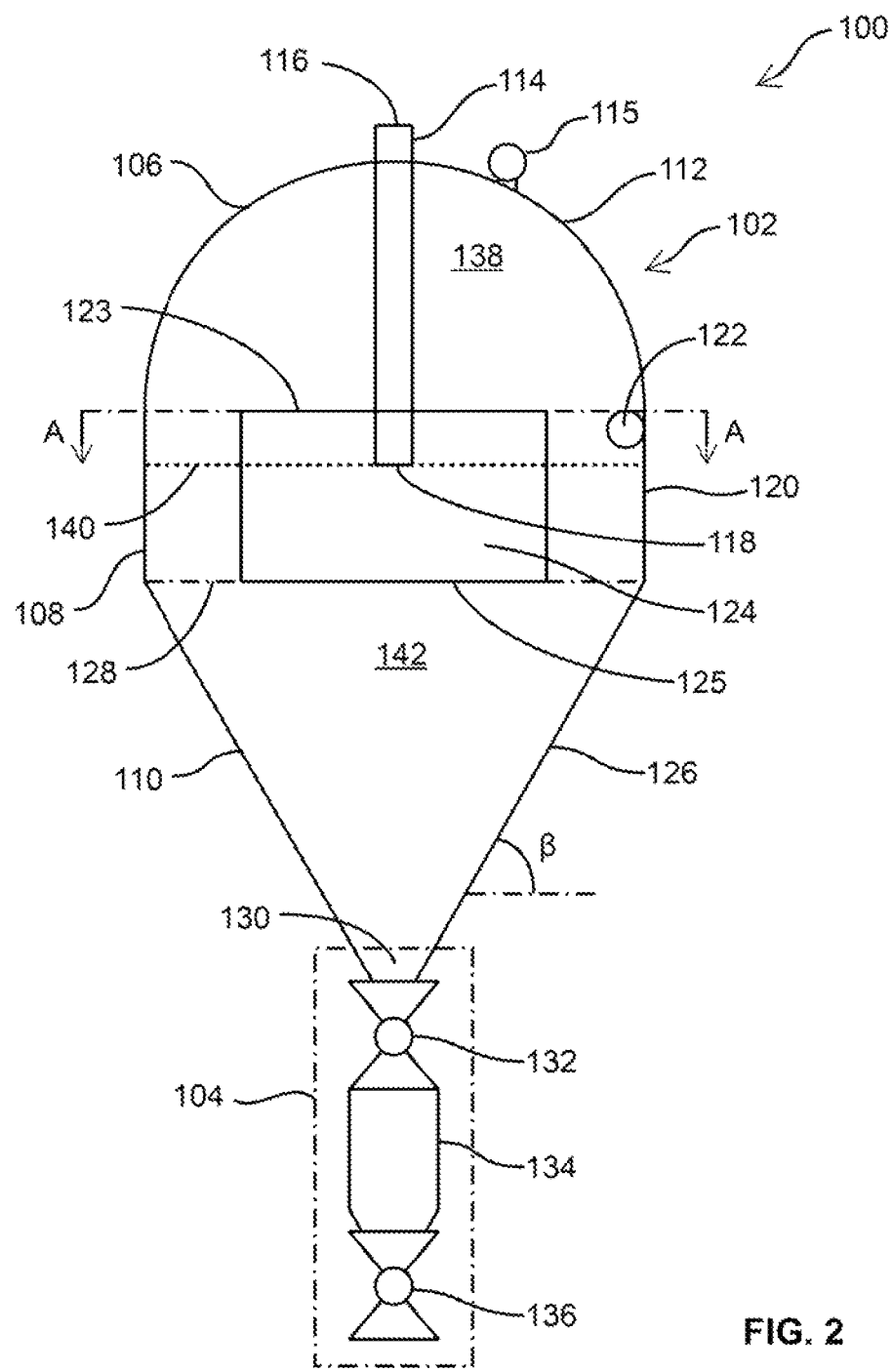
FIG. 2 is a cross-sectional side view of a desanding device, according to one embodiment.
Figure 6A:
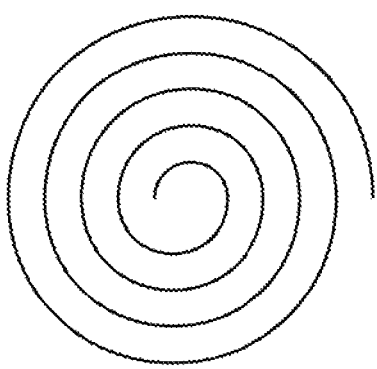
FIGS. 6A to 6D illustrate some alternative embodiments of the internal baffle, showing an internal baffle having an Archimedean spiral cross-section, a logarithmic spiral cross-section, a rectangular, piecewise-linear spiral cross-section, and a pentagonal, piecewise-linear spiral cross-section, respectively.
Figure 6B:
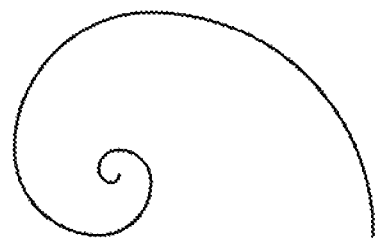
Figure 6C:
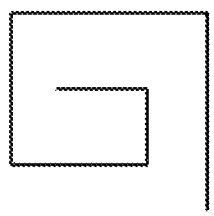
Figure 6D:
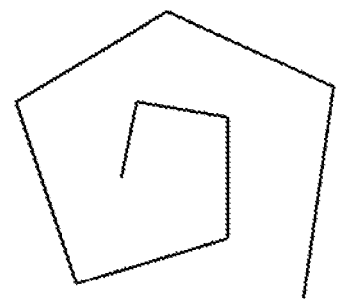

With reference to FIG. 2, in one embodiment, a desanding device 100 is presented for separating multiphase fluid stream injected therein. The desanding device 100 comprises an elongated vessel 102 coupled to a particulate collection structure 104. In this embodiment, the vessel 102 is oriented along a vertical axis, and may be partitioned, from top to bottom, into a gas dome section 106 for accommodating gas separated from the injected multiphase fluid stream, a fluid separation section 108 for separating injected multiphase fluid stream, and a particulate drop out section 110 for receiving particulate and liquid separated from the injected fluid stream.

In this embodiment, the gas dome section 106 is welded to the fluid separation section 108, and the fluid separation section 108 is welded to the particulate drop out section 110 to form the vessel 102. However, those skilled in the art would readily understand that they may alternatively be coupled using other means, e.g., suitable fasteners such as bolts and flanges.

The gas dome section 106 has a semi-elliptical or hemispherical head 112, and comprises a fluid outlet 114 thereon for discharging separated gas from the vessel 102. Here, the fluid outlet 114, in the form of a vertically oriented cylindrical tube, is located at the center of the head 112. The fluid outlet 114 comprises a discharge end 116 extending out of the vessel forming a discharge opening, and a bottom end 118 forming an intake opening. In this embodiment, the intake opening 118 of the fluid outlet 114 extends into the fluid separation section 108, and is positioned at the horizontal center thereof. The vertical position of the intake opening 118 of the fluid outlet 114 determines the position of a freeboard interface 140 of gas G above and liquid L below, defining a freeboard portion 138 thereabove and an accumulator portion 142 therebelow. The accumulator portion 142 includes a lower portion of the fluid separation section 108 and the entire particulate drop out section 110.

The fluid separation section 108 is cylindrical with a cylindrical side wall 120, which comprises a fluid inlet 122 thereon for receiving a multiphase fluid stream. The fluid separation section 108 has a volume sufficient for removing particulates from the fluid injected therein. Also, the fluid separation section 108 has a cross-section area larger than that of the fluid inlet such that the velocity of the fluid in the vessel is reduced comparing to that in the fluid inlet. In some embodiments, the diameter and height of the fluid separation section 108 are determined based on the inlet fluid velocity in the intended use scenario.

The fluid inlet 122 is positioned at a location sufficiently above the intake opening 118 of the fluid outlet 114 to ensure that the fluid inlet 122 is in the freeboard portion 138 and that the turbulence that the injected fluid stream applies to the particulates P and liquid L already captured in the accumulator portion 142 is minor.

Referring to FIG. 3A, the fluid inlet 122 extends substantially horizontally from the wall 120 into the interior space of the fluid separation section 108, and is oriented generally tangential to the side wall 120 of the fluid separation section 108 for directing the fluid stream along an internal baffle 124. The horizontally-oriented, fluid inlet 122 also allows it to be easily connected to a conventional wellhead that is typically oriented in a rectilinear or orthogonal arrangement.

The baffle 124 diverts the fluid stream along an extended path for enabling particulates P and liquid L to separate from the gas G, the particulates P and liquid L settling in the accumulator portion 142 and the gas G being collected at the fluid outlet 114. At a steady state, incoming liquid L and particulates P enter the accumulator portion 142. The particulates P settles, and substantially particulate-free liquid L is re-entrained with particulate-free gas at the intake opening 118 to the fluid outlet 114.

The fluid inlet 122 comprises a coupling end 202 for coupling to a wellhead or a piping connected to a wellhead using a flange, and a discharge end 204 for discharging injected fluid stream into the fluid separation section 108. A replaceable nozzle 206 having a flange is inserted between the flange 202 and external inlet piping (not shown). The replaceable nozzle 206 extends into the vessel 102 and does not form a pressure boundary such that any wear therein would not compromise any pressure rating of the vessel.

FIG. 4 illustrates one form of the replaceable nozzle 206. As shown, the nozzle 206 comprises a connective piping 222 in the form of a cylindrical tube, an end wall 226 at the distal end thereof, and a gap 224 intermediate the connective piping 222. In this embodiment, the end wall 226 is formed by securing a cap to the distal end of the connective piping 222. However, those skilled in the art will appreciate that other methods may alternatively be used to form the end wall 226.

The end wall 226 diverts injected fluid from immediately and erosively impinging the wall of the vessel for deflecting from, and maintaining, the integrity of the pressure boundary. The end wall 226 is sufficiently downstream such that it does not significantly impact the incoming fluid stream under normal operation, and diverts injected fluid when the injected fluid is unstable or becomes slug flow. In one embodiment, the end wall 226 is sufficiently downstream such that, at typical flow rates, incoming particulates and liquid do not significantly impact the end wall 226. Instead, only in upset or slug flow the end wall 226 intercepts the slug flow and avoids particulates contacting the pressure boundary side wall 120 and thus avoid possible degradation of the side wall 120.

The gap 224 is oriented horizontally inwardly, and in an embodiment, formed by cutting off a portion of the side wall of the connective piping 222. The gap 224 is set to a sufficient length to minimize the pressure drop that may occur when fluid stream is injected into the vessel 102 through the nozzle 206.

Referring back to FIGS. 2 and 3A, the fluid separation section 108 also comprises an internal baffle 124 made of a suitable material, such as steel, plastic or the like, capable of maintaining its integrity against the fluid stream flowing therewithin. In this embodiment, the baffle 124 is a generally upright, spiral plate that is horizontally and spirally extending from the inner side of wall 120 at a location 208 adjacent the wall of the fluid inlet 122 to about a central location 210 proximate to the fluid outlet 114, as shown in FIG. 3A.

With reference to FIGS. 2, 3A and 3B, the baffle 124 has an open top 123 extending upwardly into the freeboard portion 138, and an open bottom 125 downwardly extending into the accumulator portion 142. The baffle 124 divides at least a portion of the interior space of the fluid separation section 108 into a spiral passage 212 extending between the fluid inlet 122 at the side wall 120 and the fluid outlet 114 at a radially inward position. Therefore, the length of the passage 212, i.e., the shortest distance of travel through the passage 212 from one end near the fluid inlet 122 to the other end near the fluid outlet 114, is much longer than the direct radial distance the inlet 122 and the outlet 114.

In this embodiment, the spiral walls of baffle 124 are equally spaced along the fluid path such that the spiral passage 212 formed by the baffle 124 is generally of the same width throughout the entire passage. The height of the baffle is determined by the cross-sectional area of the passage 212 within the baffle 124, and is related to the distance between two neighboring spiral walls, i.e., the width of the spiral passage. Generally, a larger height of the baffle is required if the width of the spiral passage is narrower to achieve the cross-sectional area corresponding to the designed flow velocity. For example, in one embodiment, the width of the spiral passage is about 6 inches, and the height of the baffle is about 18 inches.

Referring again to FIG. 2, the particulate drop out section 110 is enclosed by a conical-shaped, inclined side wall 126 coupled to the fluid separation section 108 thereabove at its top opening 128, and narrowing down to the bottom opening 130 that is coupled to the particulate collection structure 104. The slope of the side wall 126, characterized by the inclination angle β between the wall 126 and a horizontal plane, is about or larger than the angle of repose of a bank of wet particulates, to facilitate particulates and liquid to migrate towards the bottom of the vessel 102 and enter the particulate collection structure 104.

In this embodiment, the particulate collection structure 104 comprises a sand accumulation chamber 134 sandwiched between an inlet valve 132 and a discharge valve 136. The inlet valve 132 is connected to the vessel 102 on top thereof and to the sand accumulation chamber 134 therebelow, and the sand accumulation chamber 134 is in turn connected to the discharge valve 136 therebelow. As will be described in more detail later, the inlet valve 132 may be set to the open position and the discharge valve 136 set to the closed position in normal operation to allow the sand accumulation chamber 134 to collect particulates and liquid from the vessel 102.

Conventional pressure safety valves 115 and other gas phase related devices and instrumentation (not shown) are reliably located on the wall of vessel 102 in the freeboard portion 138.

Although not shown in the figures, the vessel 102 is supported by supporting structure to maintain the vessel 102 in its vertical orientation. In some use scenarios, the desanding device 100 is set up at an oil and gas well site. The connective piping 222 of the replaceable nozzle 206 is connected to a wellhead, and the fluid outlet 114 is connected to downstream equipment.

In operation, the fluid stream F is injected into the vessel 102 from the wellhead through the nozzle 206, and enters the internal baffle 124. The end wall 226 breaks any high velocity slug flow entering the vessel 102 through the inlet 122, and protects the pressure boundary at the side wall 120 of the vessel 102. The gap 224 on the nozzle 206 is of sufficient length such that the end wall 226 impedes injected fluid flow only in the event of slug flow, and does not impose a significant pressure drop otherwise, nor experiences significant erosion.

After entering the vessel, the fluid flow travels through the passage 212 and travels along a spiral flow path. Under the influence of gravity, particulates and liquid in the fluid flow fall out of the spiral flow path, engage the freeboard interface 140, and fall through the fluid separation section 108 towards the bottom of the vessel 102. The particulates fall from the fluid stream F as they travel along a trajectory path along the passage 212. The freeboard interface 140 forms in a horizontal plane at about the intake opening 118 of the fluid outlet 114. The accumulator portion 142 forms below the freeboard interface 140 for continuously receiving liquid L and particulates P. The freeboard portion 138 forms above the interface 140 for accommodating gas G.

In this embodiment, the freeboard interface 140 is a substantially circular, gas/liquid interface between the accumulator and freeboard portions 142 and 138. The intake opening 118 of the fluid outlet 114 is horizontally located about the centre of the circular freeboard interface 140, and the inlet 122 is oriented tangential to the outer edge thereof. The interface 140 is intersected continuously by the spiral shaped baffle 124 as illustrated in FIG. 3A. As a result, the trajectory of the particulates P and liquid L of the fluid stream F converge with the freeboard interface 140. The trajectory for dropping particulates P and the liquid L is governed by the fluid properties and the geometry of the cylindrical section of the vessel 102. Once the particulates and liquid have dropped into the particulate drop out section 110, they are separated from the active flow stream and begin to migrate towards the particulate collection structure 104. Since the slope of the side wall 126 of the particulate drop out section 110 is steeper than the angle of repose of the sand bank, particulates and liquid fall through the open inlet valve 132 into the sand accumulation chamber 134.

FIGS. 5A and 5B show a simplified illustration of the flow path in the fluid separation section 108 of the vessel 102. FIG. 5A shows the flow path 252 in a cross-sectional top view of the fluid separation section 108, and FIG. 5B shows an "unwrapped side view" of the baffle 124 and flow path 252 that are "unwrapped" to a two-dimensional plane. In both figures, reference lateral positions L0 to L4 are marked for matching the top view with the unwrapped side view. As can be seen, the injected fluid stream travels through the passage 212 along a spiral flow path 252. Gas G leaves the fluid flow and accumulates in the freeboard portion 138 of the vessel 102. Liquid L and particulates P generally move downwardly along the spiral flow path 252 and fall out of the fluid flow into the accumulator portion 142 of the vessel 102. As the movement of the fluid flow in the fluid separation section 108 causes turbulence, the actual movement of gas G, liquid L and particulates P is complex and exhibits a certain level of randomness. The baffle 124, on the other hand, acts against the turbulence, and reduces the probability that particulates enter the fluid outlet 114. For example, without the baffle 124, particulates at location L1 may move along a direct path between L1 and the intake port 118 of the fluid outlet 114 and enters the fluid outlet 114. With the baffle 124, such a direct path is blocked by the baffle 124, and particulates at L1 will move through the passage 212 and fall into the accumulator portion 142.

After start of operation, particulates P and liquid L fill the particulate collection structure 104, and continue to accumulate in the accumulator portion 142. The accumulated liquid L in the accumulator portion 142 form a liquid surface, which grows upward towards the freeboard interface 140 with the accumulation of particulates and liquid. The freeboard interface 140 represents the highest level that the liquid surface may reach.

Gas G traverses the freeboard portion 138, and is discharged from the fluid outlet 114 while particulates P and liquid L are accumulated in the accumulator portion 142. At a steady state, the level of the liquid surface grows to the freeboard interface 140, and reaches the intake opening 118 of the fluid outlet 114. Therefore, oil and other liquids are re-entrained with the gas G exiting at the fluid outlet 114. Such a steady state may last for a long time until the accumulated particulates also reach the intake opening 118 of the fluid outlet 114, when desanding fails. Such desanding failure is prevented and operations are extended in time by periodically removing accumulated particulates from the particulate collection structure 104 (described later) before the accumulated particulates reach the intake opening 118 of the fluid outlet 114.

In cases that the fluid stream contains significant fraction of particulates, particulates accumulate quickly. Desanding would be compromised if the accumulated particulates reach the intake opening 118 of the fluid outlet 114. Such an occurrence is prevented by periodically removing accumulated particulates from the particulate collection structure 104.

Velocity of gas in the freeboard portion 138 proximate the discharge end 204 of the fluid inlet 122 is slower than that in the fluid inlet 122, which facilitates the falling off of particulates P and liquid L from the fluid stream F. When gas G approaches the intake opening 118 of the fluid outlet 114, velocity of gas may increase, e.g., velocity of gas in the freeboard portion 138 proximate the intake opening 118 of the fluid outlet 114 may be higher than that at other locations of the freeboard portion 138. However, this occurs only after the particulates P have dropped out of the gas phase of the flow stream. Liquid in the accumulator portion 142 is considered stagnant, governed only by fluid drag from the motion of the liquid in the cylindrical section, and will have minimal velocity. Particulates falling into this section can be considered removed from the flow stream.

The slope of the side wall 126 of the particulate drop out section 110, characterized by the inclination angle $\beta$ between the wall 126 and a horizontal plane, can be determined for a given diameter of vessel 102 to accommodate the estimated angle of repose of the sand bank. In this embodiment, as the particulate drop out section 110 is of a conical shape, the inclination angle $\beta$ generally the same anywhere in the particulate drop out section 110.

Unlike the prior art desanders that require shutting down the operation to depressurize the vessel for removing accumulated particulates, the removal of accumulated particulates can be conducted periodically with the vessel 102 remaining pressurized and in operation. For this purpose, the valves 132 and 136 are controlled manually by an operator or automatically with a timer or an ultrasonic sand detector to periodically open and close. Typically, an interlock is used to prevent the inlet and discharge valves from being open at the same time. In particular, the valve 132, between the sand vessel 102 and the sand accumulation chamber 134 is normally open except at the time of particulate removal, allowing particulates to fall into the sand accumulation chamber 134. The discharge valve 136 is normally closed except at the time of particulate removal.

To remove particulates while maintaining the desanding device 100 in operation, the valve 132 is first closed. Valve 136 is then opened allowing the particulates contained in the sand accumulation chamber 134 to exit. After removing particulates from the sand accumulation chamber 134, valve 136 is closed and valve 132 is then reopened to allow particulates in the particulate drop out section 110 to migrate into the sand accumulation chamber 134. Persons skilled in the art appreciate that the particulate drop out section 110 has sufficient space to store particulates inside the vessel 102 during the particulates-removing process, and the volume of the sand accumulation chamber 134 is sufficiently large to discharge enough particulates within a cleaning cycle so as not to cause a backup of particulates into valve 132 thereby preventing the valve to close. Both valves 132 and 136 are required to have service rated for abrasive slurries.

As an alternate, if line washing is desired and the downstream piping is able to support the pressure, valve 132 can be left open. Accordingly, valve 136 is opened only for a short period of time, or pulsed, sufficient to allow the volume of the sand accumulation chamber 134 to be evacuated, and closed again before the liquid inventory thereabove is exhausted.

Compared to prior art desanders, the desanding device 40 has the advantage of requiring less horizontal operational space. For example a desander as described in U.S. Pat. No. 6,983,852, assigned to the Applicant of the subject application, includes a horizontally oriented vessel having a nominal 0.3 meter (i.e., 12 inches) diameter and a 3.048 meters (i.e., 10 feet) length. Another desander as described in the same US patent but for a different operational condition includes a vessel having a 0.3 meter (i.e., 12 inches) diameter and a 6.096 meters (i.e., 20 feet) length. Both desanders are fitted with a downcomer weir to set the freeboard portion. To compare, a desanding device 100 has a vessel diameter of 1.2 meters (i.e., 48 inches). The height of the fluid separation section 108 is 0.45 meter (i.e., 18 inches). The inclination angle $\beta$ of the wall 126 of the particulate drop out section 110 is 45 degrees or greater.

Those skilled in the art would appreciate that, instead of being hemispherical in shape, the gas dome section 106 may alternatively be of other shapes, depending, in part, upon the design and pressure-resistance requirements. For example, in one alternative embodiment, the gas dome section 106 may be cylindrical having a cylindrical side wall and a circular head. In another embodiment, the gas dome section 106 may be semi-elliptical head. Similarly, other sections of the vessel 102 may be of other shapes in alternative embodiments. In an alternative embodiment that the desander is used for removing particulates from low pressure fluid stream, one or more sections of the vessel 102, e.g., the gas dome section 106, may be of other shapes, e.g., a cubic having rectangular shaped side walls and a rectangular head. Those skilled in the art appreciate that, in any embodiment, all sections 106, 108 and 110 are designed and integrated to meet the pressure-resistance requirement.

Those skilled in the art appreciate that the particulate collection structure 104 may alternatively comprise different components. For example, in some alternative embodiments, the particulate collection structure 104 may be a simple sand sump having a simple valve, a blind, or quick access port that is closed during desanding operations, and is only opened for cleaning out particulates accumulated in the particulate drop out section 110.

Those skilled in the art appreciate that, partitioning the vessel 102 into a gas dome section 106, a fluid separation section 108 and a particulate drop out section 110 is for the ease of description, and a desanding device implemented as described above does not necessarily need to exhibit distinction between the sections 106, 108 and 110.

In some other embodiments, the vessel 102 does not comprise a cone-shaped particulate drop out section 110, and the particulate drop out section 110 may take any suitable shape, e.g., a cylindrical shape with a flat floor. An opening may be configured at the floor or the lower portion of the side wall of the particulate drop out section 110 for receiving a particulate removal valve or a particulate collection structure 104.

The baffle 124 in the fluid separation section 108 may be of different shapes in alternative embodiments. For example, the cross-sectional shape of the baffle 124 may be a spiral curve of different types, such as Archimedean spiral, Cornu spiral, Fermat's spiral, hyperbolic spiral, lituus, logarithmic spiral, spiral of Theodorus, or the like, depending on the design. As another example, the cross-sectional shape of the baffle 124 may be a spiral formed by straight line segments. FIGS. 6A to 6D show some examples of various cross-sectional shape of the baffle 124 that may be adopted in various alternative embodiments.

Figure 7:
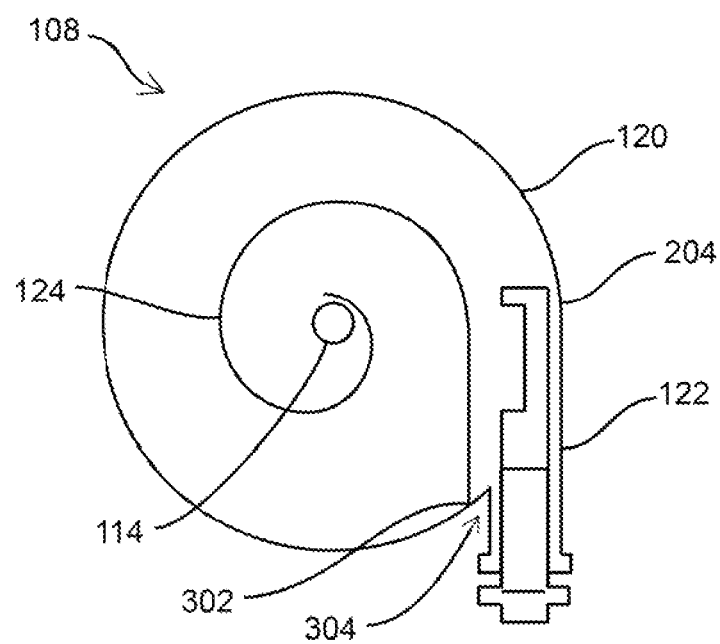
FIG. 7 is a top plan view of the desanding device, according to an alternative embodiment.

In above embodiments, the baffle 124 extends from the inner side of wall 120 at a location 208 adjacent the wall of the fluid inlet 122 such that the wall of the fluid inlet 122 smoothly aligned to the baffle 124. In an alternative embodiment as shown in FIG. 7, the baffle 124 extends from the inner side of wall 120 at a location 302 slightly away from the wall of the fluid inlet 122 such that the wall of the fluid inlet 122 transits to the baffle 124 via a step 304.

Although in above description, the fluid inlet 122 is oriented horizontally and thus is perpendicular to the vertical axis, in some alternative embodiments, the fluid inlet 122 may have other orientations including an incline to the vertical axis.

In an alternative embodiment, a different nozzle, e.g., a replaceable nozzle as set forth in Applicant's Patent CA 2,535,215 issued May 8, 2008, may be used. Those skilled in the art will also appreciate that, in some alternative embodiment, no nozzle is used, and the fluid inlet 122 is connected directly to the wellhead.

The desanding devices described in this disclosure generally exploit the effect of gravity to separate particulates from the multiphase fluid stream injected into a vessel having a limited size, which provide significant advantage for use in oil and gas sites that offer limited operational space.

In above embodiments, the multiple-phase fluid stream comprises liquid L. In some alternative embodiments, the multiple-phase fluid stream does not comprise liquid L. In these embodiments, the freeboard interface 140 represents the highest level that particulates may be accumulated to. In other words, the desanding device 100 will fail if the accumulated particulates in the vessel reaches the freeboard interface 140. Such a failure is prevented by periodically removing accumulated particulates from the vessel 100.

Figure 8A:
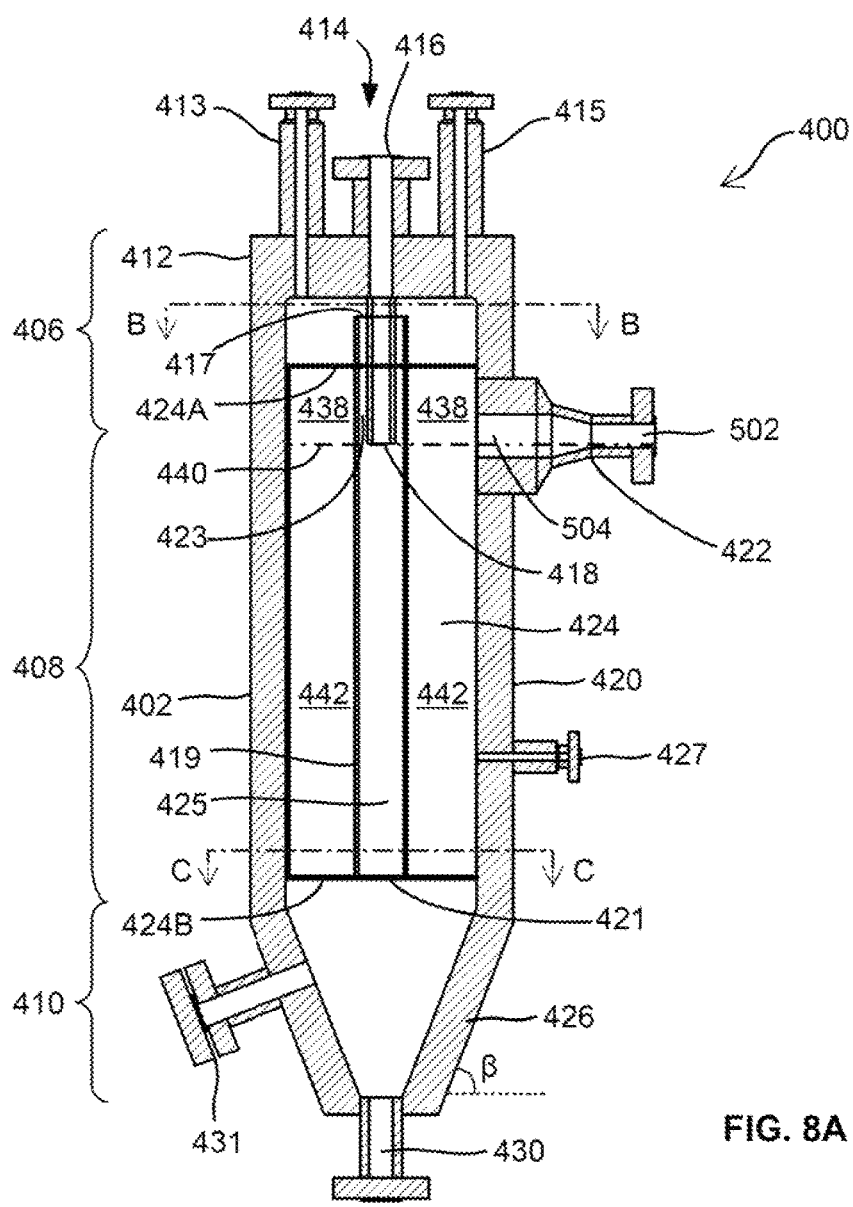
FIG. 8A is a cross-sectional side view of a desanding device, according to an alternative embodiment.

With reference to FIG. 8A, in an alternative embodiment, a desanding device 400 is presented for separating multiphase fluid stream injected therein. The desanding device 400 is similar in many aspects to the desanding device 100, having an additional feature to aid in particulate separation in the accumulator portion 142 before re-entrainment with the gas G. The desanding device 400 comprises an elongated vessel 402 coupled to a particulate collection structure (not shown) therebelow. In this embodiment, the vessel 402 is oriented along a vertical axis, and may be partitioned, from top to bottom, into a gas dome section 406 for accommodating gas separated from the injected multiphase fluid stream, a fluid separation section 408 for separating injected multiphase fluid stream, and a particulate drop out section 410 for receiving particulate and liquid separated from the injected fluid stream.

In this embodiment, the gas dome section 406 is welded to the fluid separation section 408, and the fluid separation section 408 is welded to the particulate drop out section 410 to form the vessel 402. However, those skilled in the art would readily understand that they may alternatively be coupled using other means, e.g., suitable fasteners such as bolts and flanges.

The gas dome section 406 has a flat head 412 such as a forged component, and comprises thereon a pressure sensing valve 413 for sensing the pressure in the vessel 402, a depressurization valve 415 for depressurizing the vessel 402 as needed such as during vessel maintenance, and a fluid outlet 414 for discharging separated gas from the vessel 402. Here, the fluid outlet 414, in the form of a vertically oriented cylindrical tube, is located radially inwardly, typically located at the center of the head 412.

The fluid outlet 414 comprises a discharge end 416 extending out of the vessel, and an intake opening 418. In this embodiment, the intake opening 418 of the fluid outlet 414 extends into the fluid separation section 408, and is positioned at the horizontal center thereof. The vertical position or the elevation of the intake opening 418 of the fluid outlet 414 determines the position of a freeboard interface 440, defining a freeboard portion 438 thereabove and an accumulator portion 442 therebelow. The accumulator portion 442 includes a lower portion of the fluid separation section 408 and the entire particulate drop out section 410.

The intake opening 418 of the fluid outlet 414 is received in an elongated shroud 419 oriented parallel to the longitudinal axis of the vessel 402. The shroud 419 aids in better selecting a particulate-free liquid for removal at the fluid outlet 414. In this embodiment, the shroud 419 is a conduit having an upper opening 417 and a lower opening 421, positioned generally about the horizontal center of the vessel 402, and extending downwardly from a location in the freeboard portion 438 to a location in the accumulator portion 442 sufficiently below the intake opening 418 of the fluid outlet 414. In this embodiment, the cross-sectional area of the shroud 419 is much smaller than that of the vessel 402, the annular area resulting in low velocities amenable to particulate settling.

The upper opening 417 of the shroud 419 receives the fluid outlet 414, with an annulus therebetween forming an annular gas channel 423 for gas to flow into the shroud 419 for discharge from the fluid outlet 414. The lower opening 421 and the lower portion of the shroud 419 form a liquid channel 425 for liquid to flow into the shroud 419. As described above, the lower opening 421 of the shroud 419 is sufficiently below the intake opening 418 of the fluid outlet 414 such that the turbulence of the liquid in the liquid channel 425 near the intake opening 418 of the fluid outlet 414 is significantly reduced. In this embodiment, the lower opening 421 of the shroud 419 is shown flush to the bottom of an internal baffle 414 (described in more detail later).

The fluid separation section 408 is cylindrical with a cylindrical side wall 420, which comprises a fluid inlet 422 thereon for receiving a multiphase fluid stream, and a purge line connection 427 below the fluid inlet 422 for cleansing the vessel 402 during maintenance. The fluid separation section 408 has a volume sufficient for removing particulates from the fluid injected therein. Also, the fluid separation section 408 has a cross-section area larger than that of the fluid inlet 422 such that the velocity of the fluid in the vessel is reduced comparing to that in the fluid inlet. In some embodiments, the diameter and height of the fluid separation section 408 are determined based on the inlet fluid velocity in the intended use scenario.

The fluid inlet 422 is positioned at a location above the intake opening 418 of the fluid outlet 414 to ensure that the fluid stream F enters the vessel 402 at or above the freeboard interface 440.

Figure 8B:
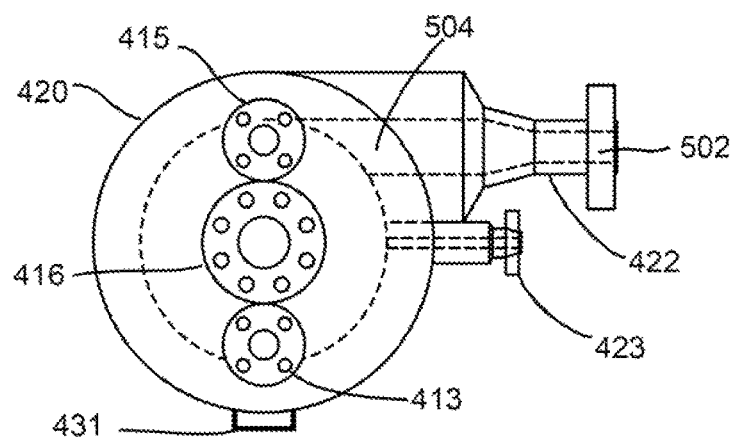
FIG. 8B is a top view of the desanding device of FIG. 8A, with broken lines showing the interior structure of the device.
Figure 8C:
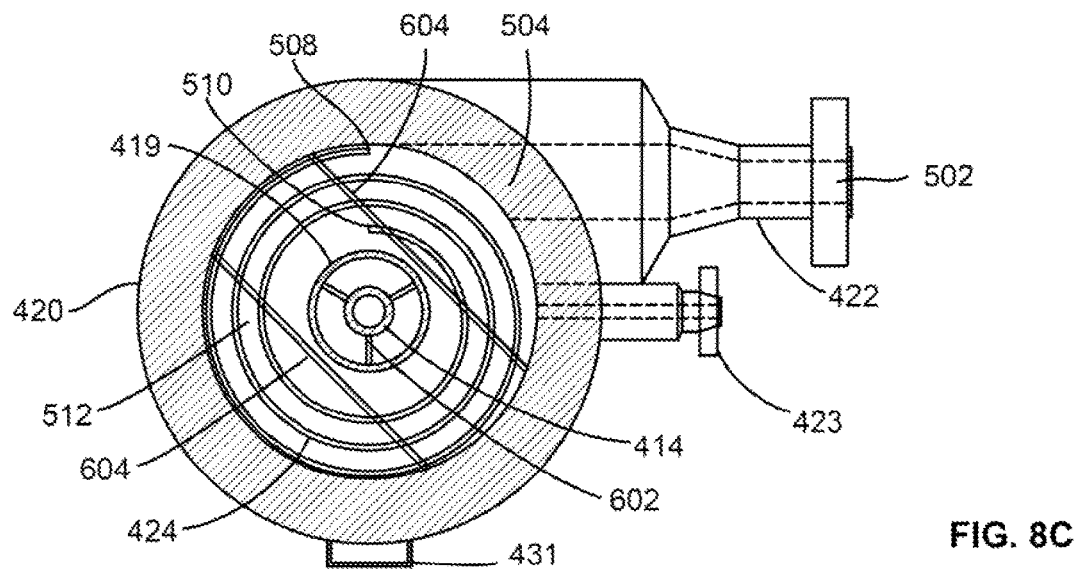
FIG. 8C is the cross-sectional view along section B-B of the desanding device of FIG. 8A.
Figure 8D:
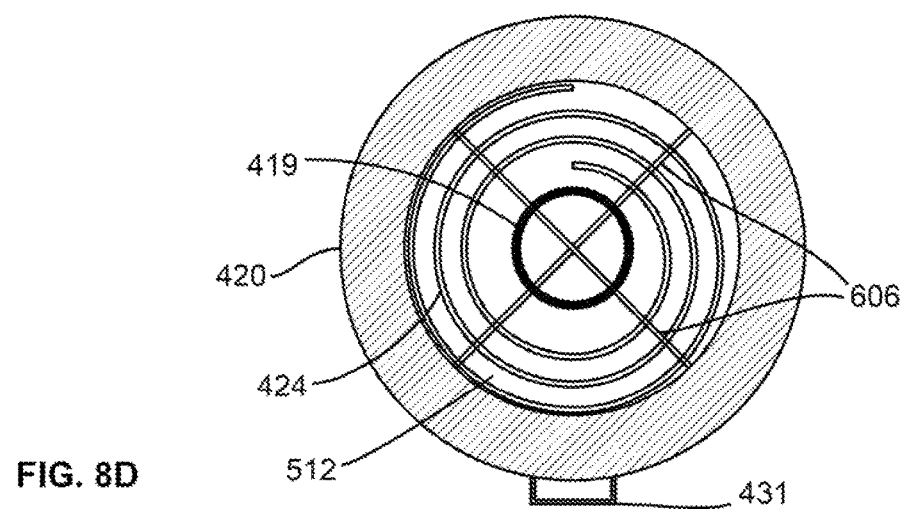
FIG. 8D is the cross-sectional view along section C-C of the desanding device of FIG. 8A.

Referring to FIG. 8B, the fluid inlet 422 extends substantially horizontally from the wall 420 into the interior space of the fluid separation section 408, and is oriented generally tangential to the side wall 420 of the fluid separation section 408 for directing the fluid stream along an internal baffle (see the internal baffle 424 in FIGS. 8C and 8D, the inlet baffle is not shown in FIGS. 8A and 8B for simplification of the drawings). Again, the horizontally-oriented, fluid inlet 422 also allows it to be easily connected to a conventional wellhead that is typically oriented in a rectilinear or orthogonal arrangement.

The fluid inlet 422 comprises a coupling end 502 for coupling to a wellhead or a piping connected to a wellhead using a flange, and a discharge end 504 for discharging injected fluid stream into the fluid separation section 108. In this embodiment, the discharge end 504 has a cross section larger than that of the coupling end 502 for reducing the velocity of fluid injected into the vessel 402, which is further reduced after the fluid is injected into the vessel 402 as the vessel 402 has a cross section larger than that of the discharge end 504 of the fluid inlet 422. In this embodiment, the fluid inlet 422 does not comprise a replaceable nozzle.

Referring to FIGS. 8C and 8D, the fluid separation section 408 also comprises an internal baffle 424 made of a suitable material, such as steel, plastic or the like, capable of maintaining its integrity against the fluid stream flowing therewithin. The baffle 424 is similar to the baffle 124 of the embodiment described in FIGS. 1 to 7. In particular, the baffle 424 a generally upright, spiral plate that is horizontally and spirally extending from the inner side of wall 420 at a location 508 adjacent the wall of the fluid inlet 422 to about a central location 510 proximate to the fluid outlet 414.

In the example of FIGS. 8A to 8D, the baffle 424 has about three revolutions. However, the baffle 424 may have different number of revolutions in various embodiments, depending on the system design. Generally, it is preferable that the cross-section area of the space between two adjacent revolutions of the baffle 424 is larger than that of the fluid inlet 422 to slow down the velocity of the fluid stream to facilitate particulate settling. Therefore, for a given internal diameter of the vessel 402, a baffle 424 with more revolutions generally reduces the cross-sectional width between two adjacent revolutions, and thus requires that the height of the baffle 424 to be increased to maintain the cross-sectional area.

The baffle 424 has an open top 424A extending upwardly into the freeboard portion 438, and an open bottom 424B downwardly extending into the accumulator portion 442 to a location about the bottom thereof. The baffle 424 divides at least a portion of the interior space of the fluid separation section 408 into a spiral passage 512 between the fluid inlet 422 and the fluid outlet 414. Therefore, the length of the passage 512, i.e., the shortest distance of travel through the passage 512 from one end near the fluid inlet 422 to the other end near the fluid outlet 414, is much longer than the direct distance between the fluid inlet 422 and the fluid outlet 414.

The baffle 424 is fixed to the side wall 420 of the vessel 402 by supporting bars. As shown in FIG. 8C, the top of the baffle 424 is fastened, e.g., welded, to a pair of parallel supporting bars 604, which are in turned fastened to the side wall 420 of the vessel 402. The distance between the supporting bars 604 is sufficient for the shroud 419 to pass through. Also shown in FIG. 8C, the top of the shroud 419 is fastened to the fluid outlet 414 via a set of supporting bars 602.

As shown in FIG. 8(D), the bottom of the baffle 424 and the bottom of the shroud 419 are flush and are fastened to a pair of crossbars 606, which are in turned fastened to the side wall 420 of the vessel 402.

Referring again to FIG. 8A, the particulate drop out section 410 is enclosed by a conical-shaped side wall 426 coupled to the fluid separation section 408 thereabove, and narrowing down tot a bottom opening, forming a particular outlet 430. In this embodiment, the particulate outlet 430 is a normally closed valve that may be open to drain accumulated particulate out of the vessel 402 during periodic maintenance. In this embodiment, the particulate drop out section 410 also comprises a normally closed inspection window 431 that may be opened for vessel inspection.

Figure 9:
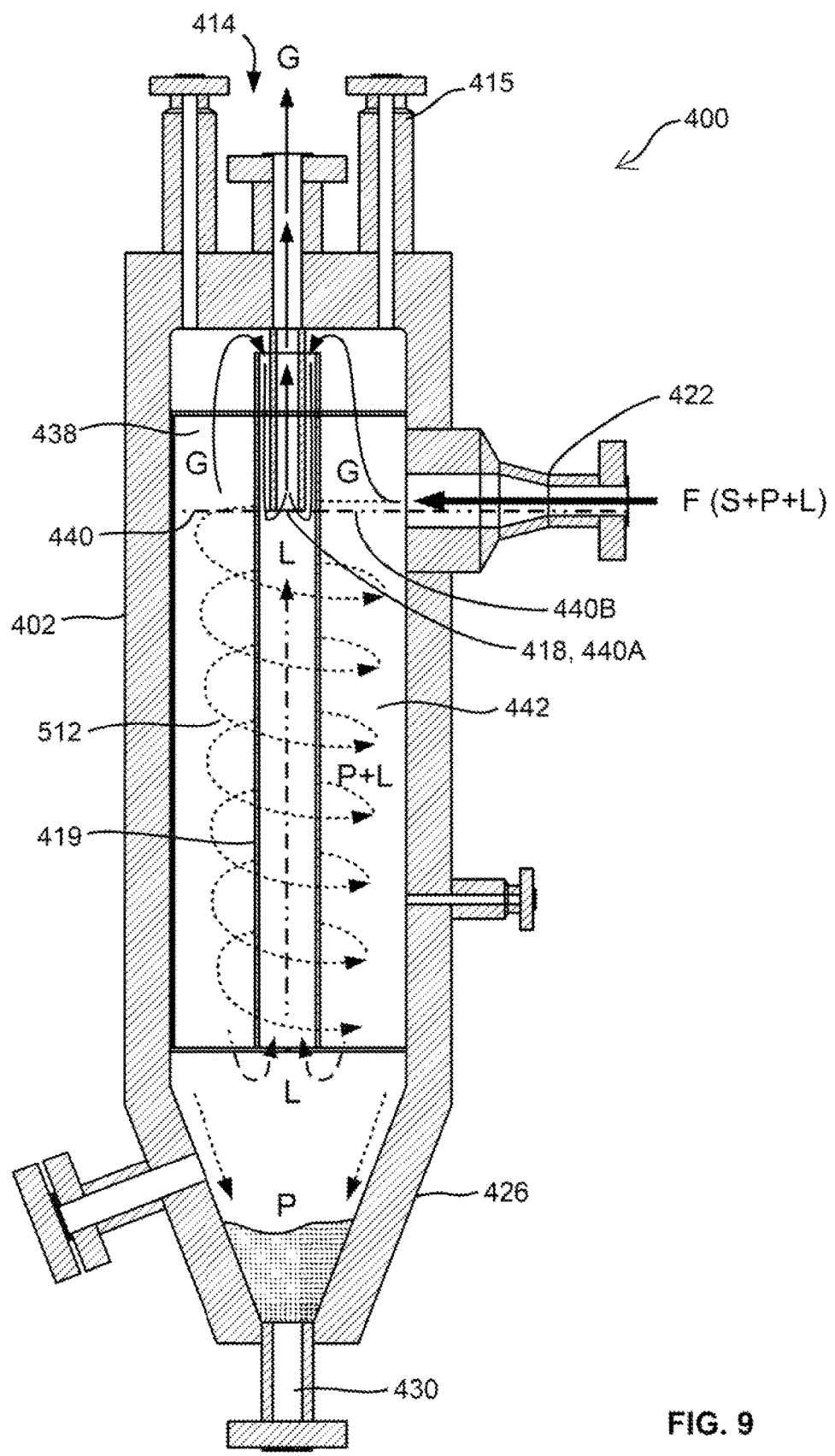
FIG. 9 illustrates the desanding operation of the desanding device of FIG. 8A.

Turning to FIG. 9, the operation of the desanding device 400 is now described. For the ease of illustration, details of the spiral portion of the baffle 424 are not shown.

In operation, a fluid stream F is injected into the vessel 402 from the wellhead through the fluid inlet 422, and enters the internal baffle 124. The fluid flow travels through the passage 512 and travels along a spiral flow path outside the shroud 419. Under the influence of gravity, particulates and liquid in the fluid flow fall out of the spiral flow path, engage the freeboard interface 140, and fall through the fluid separation section 408 towards the bottom of the vessel 402. The particulates fall from the fluid stream F as they travel along a trajectory path along the passage 512. The freeboard interface 440 forms in a horizontal plane at about the intake opening 418 of the fluid outlet 414. The accumulator portion 442 forms below the freeboard interface 440 for continuously receiving liquid L and particulates P. The freeboard portion 438 forms above the interface 440 for accommodating gas G.

In this embodiment, the freeboard interface 440 is a substantially circular, gas/liquid interface between the accumulator and freeboard portions 442 and 438. The intake opening 418 of the fluid outlet 414 is at an elevation about that of the center line of the fluid inlet 422 and horizontally located about the centre of the circular freeboard interface 440, and the fluid inlet 422 is oriented tangential to the outer edge thereof. Also referring to FIGS. 8C and 8D, the interface 440 is divided by the shroud 419 into an inner portion 440A within the shroud 419 and an outer portion 440B outside the shroud 419. The outer portion 440B is intersected continuously by the spiral shaped baffle 424. The elevation of the upper opening 417 of the shroud 419 is above the top 424A of the baffle 424, and is above the bottom opening 418 of the fluid outlet 416. The trajectory of the particulates P and liquid L of the fluid stream F converge with the freeboard interface 440. Gas G escapes from the fluid stream F and traverses the freeboard portion 438. The gas G in the freeboard portion 438 enters the gas channel 423 (see FIG. 8A) of the shroud 419 via the upper opening 417 thereof, and is discharged from the fluid outlet 414.

Particulates and liquid L of the fluid stream F move downwardly along the spiral passage 512, and drop into the particulate drop out section 410. The trajectory for dropping particulates P and the liquid L is governed by the fluid properties and the geometry of the cylindrical section of the vessel 402. Once the particulates and liquid have dropped into the particulate drop out section 410, they are separated from the active flow stream and migrate towards the bottom of the vessel 402. The shroud 419 separates the particulate-laden liquid L t the outer portion 440B of the freeboard interface 440 from cleaner liquid L t the inner portion 440A.

Particulates P and liquid L fall towards the bottom of the vessel 402 and accumulate in the accumulator portion 442. In cases that the fluid stream contains more liquid than particulates, the accumulated particulates and liquid in the accumulator portion 442 has a liquid surface, which grows upward towards the freeboard interface 440 with the accumulation of particulates and liquid.

When the liquid level grows above the bottom of the shroud 419, the liquid accumulates inside and outside the shroud 419. At a steady state, the level of the liquid surface grows to the freeboard interface 440, and reaches the intake opening 418 of the fluid outlet 414 while the particulates remain below the bottom of the shroud 419. Oil and other liquids flow into the shroud 419 via the lower opening 421 (see FIG. 8A) and flow upward through the liquid channel 425. At the fluid outlet 414, liquid L is re-entrained with the gas G and are both discharged from the fluid outlet 414. Such a steady state may last for a long time until the accumulated particulates also reach the bottom of the shroud 419, when desanding fails. Such desanding failure is prevented by periodically removing accumulated particulates from the vessel 402 via the particulate outlet 430.

In cases that the fluid stream contains more particulates than liquid, particulates are accumulated faster than liquid. Desanding would fail if the accumulated particulates reach the bottom of the shroud 419. Such an occurrence is prevented by periodically removing accumulated particulates from the vessel 402 via the particulate outlet 430.

Figure 1:
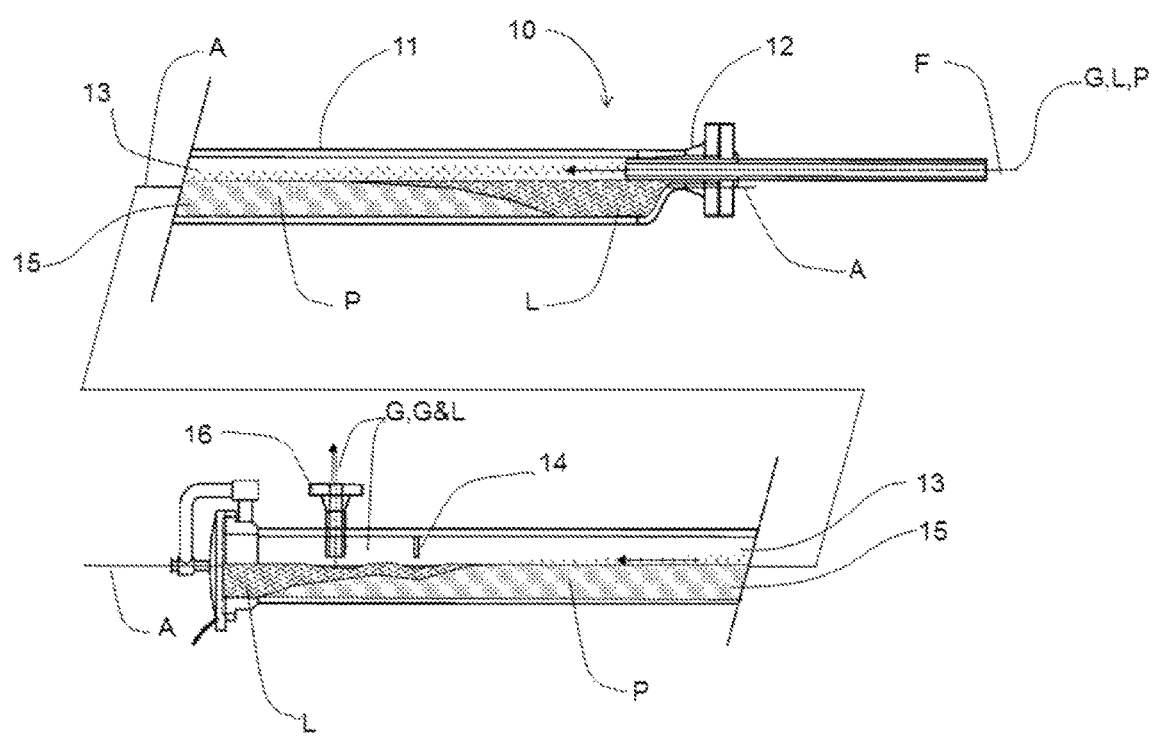
FIG. 1 is a cross-sectional side view of Applicant's prior art elongated horizontal desander illustrating downcomer flow barrier, fluid streams, falling trajectory of particulates, and accumulations of separated liquid, particulates and particulate-free fluid discharge.

Similar to the embodiment of FIG. 1, velocity of gas in the freeboard portion 438 proximate the discharge end 504 of the fluid inlet 422 is slower than that in the fluid inlet 422, which facilitates the falling off of particulates P and liquid L from the fluid stream F. When gas G approaches the intake opening 418 of the fluid outlet 414, velocity of gas may increase, e.g., velocity of gas in the freeboard portion 438 proximate the intake opening 418 of the fluid outlet 414 may be higher than that at other locations of the freeboard portion 438. However, this occurs only after the particulates P have dropped out of the gas phase of the flow stream.

The downwardly spiral flow of liquid and particulates in the the fluid separation section 408 causes turbulence therein, which is worsened when the velocity of the fluid flow is high, e.g., when the desanding device 400 is used for desanding a high velocity fluid stream F. The shroud 419 separates the liquid therein from the liquid outside thereof, isolating the liquid near the intake opening 418 of the fluid outlet 414 from the fluid stream F and the turbulence of the settling liquid outside the shroud 419. Consequently, the opportunity for particulates to be carried upwardly by turbulent liquid to the intake opening 418 of the fluid outlet 414 and discharged from the fluid outlet 414, is reduced.

In an example, the vessel 402 has a two (2) foot inner diameter with a fluid separation section 408 of a length of six (6) feet. The fluid inlet 422 has a diameter of 11 and ½ inches at the coupling end 502. The fluid outlet 414 has a diameter of 3 and ½ inches, and the shroud 419 has a diameter of 8 and ⅝ inches. The top of the shroud 419 is about two (2) to three (3) inches above the intake opening 418 of the fluid outlet 414, and the bottom of the shroud 419 is flush with the bottom of the baffle 424. The baffle 424 has about five (5) spiral revolutions. This example of the desanding device is designed to process a multiple-phase fluid stream F at a rate of 450 m3/day. The vessel is capable of operating under a pressure up to 6000 psig (pounds per square inch gauge).

In another example, the vessel 402 has a four (4) foot inner diameter with a fluid separation section 408 of a length of 12 feet, with a shroud 419 of a length about ⅔ of that of the baffle 424. The baffle 424 has about 10 spiral revolutions. This example of the desanding device is designed to process a multiple-phase fluid stream F at a rate of 2225 m3/day.

Those skilled in the art appreciate that the vessel 102 or 402 ma be made of any suitable dimensions based on design requirements and known physical theories. For example, the dimensions of the vessel may be chosen to meet the requirement of desanding capability. The dimensions of the fluid inlet and the fluid outlet may be chosen to ensure that the flow rate of the fluid inlet would not exceed the maximum flow rate of the fluid outlet such that, under designed use, the liquid level would not grow above the freeboard interface of the vessel.

In above embodiment, the shroud is an elongated cylindrical conduit. In some other embodiments, the shroud may have other suitable shapes such as an elongated pipe with rectangular, triangular, polygonal or other non-circular cross section.

In other embodiments, the bottom of the shroud 419 does not necessarily be flush with that of the baffle 424. For example, in an alternative embodiment, the vertical distance between the bottom of the shroud 419 and that of the baffle 424 is about one third of the vertical length of the baffle 424. In another embodiment, the bottom of the shroud 419 may be lower than that of the baffle 424, subject to the design requirement of desanding performance, in particular, removal of particulates before entering the shroud 419.

Figure 10:
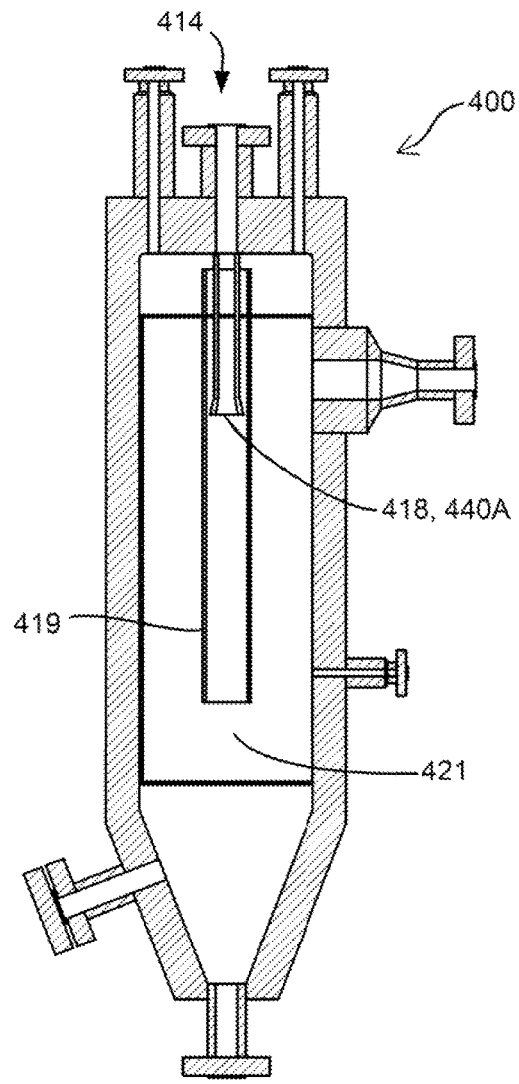
FIG. 10 is a cross-sectional side view of a desanding device according to another embodiment, wherein the fluid outlet comprises an expanded intake opening.
Figure 11:
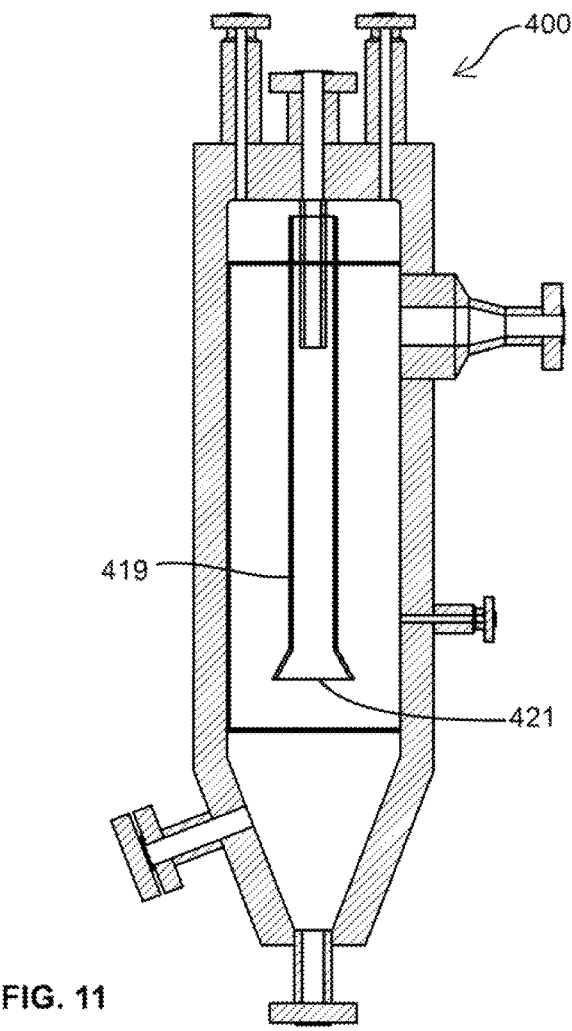
FIG. 11 is a cross-sectional side view of a desanding device according to yet another embodiment, wherein the shroud comprises an expanded intake opening.

As shown in FIG. 10, in an alternative embodiment, the fluid outlet 414 may comprise an expanded intake opening 418, such as a conical lower portion with an expanded bottom opening. As shown in FIG. 11, in another embodiment, the shroud 419 may comprise an expanded lower opening 421, such as a conical lower portion with an expanded bottom opening. In yet another embodiment, both the fluid outlet 414 and the shroud 419 may comprise expanded openings 418 and 421.

In another embodiment, the shroud 419 comprises a top wall having an opening sealably receiving the fluid outlet 414. In this embodiment, the upper opening 417 is an opening on the sidewall of the shroud 419 proximate to the top thereof.

In another embodiment, the shroud 419 comprises a closed bottom. In this embodiment, the lower opening 421 is an opening on the sidewall of the shroud 419 proximate to the bottom thereof.

In above embodiment, the fluid inlet 422 does not comprise a replaceable nozzle. However, in an alternative embodiment, the fluid inlet 422 comprises a replaceable nozzle 206 as described above and shown in FIG. 4. In this embodiment, the gap 224 is oriented facing downwardly.

In another embodiment, the particulate outlet 430 is coupled to a particulate collection structure (not shown) described above for periodically removing accumulated particulates without interrupting the desanding operation.

In above embodiments, the fluid inlet 422 is located above the elevation of the intake opening 418 of the fluid outlet 414. In an alternative embodiment, the fluid inlet 422 is located on the side wall 420 of the vessel 402 at an elevation below the intake opening 418 of the fluid outlet 414. Particulates fall from the flow path before reaching the intake opening 418 of the fluid outlet 414.

In another embodiment, the fluid inlet 422 is located on the side wall 420 of the vessel 402 at an elevation below the intake opening 418 of the fluid outlet 414, and a liquid level controller comprising a liquid level sensor and a controlled valve, is used to prevent the liquid level from growing above the fluid inlet 422.

In above embodiments, the discharge end 204 of the fluid inlet 122 ( FIG. 3A) and the discharge end 504 of the fluid inlet 422 (FIG. 8A) are above the freeboard interfaces 140 or 440, respectively. In an alternative embodiment, the discharge end of the fluid inlet is below the freeboard interface. The disadvantage of the desanding device in this embodiment is that, the liquid level may grow above the discharge end of the fluid inlet, and when it occurs, the fluid stream is injected into the vessel under the liquid surface, and may cause greater turbulence than injecting the fluid stream above the liquid surface.

Figure 12:
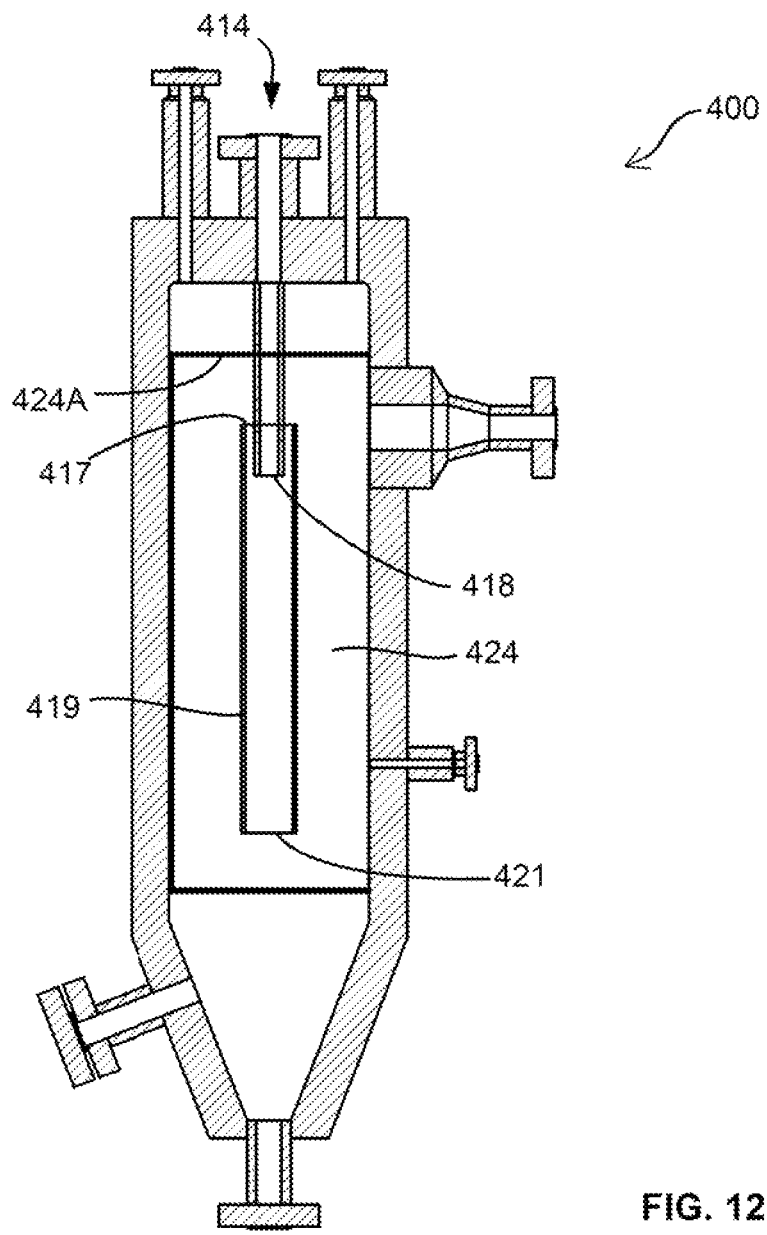
FIG. 12 is a cross-sectional side view of a desanding device according to still another embodiment, wherein the top end of the shroud is at an elevation lower than the top of the baffle.

In above embodiments that the vessel 400 comprises a shroud 419, the elevation of the upper opening 417 of the shroud 419 is above the top 424A of the baffle 424. In an alternative embodiment as shown in FIG. 12, the elevation of the upper opening 417 of the shroud 419 is below the top 424A of the baffle 424, but is above the bottom opening 418 of the fluid outlet 416.

In an alternative embodiment that the vessel comprises a shroud as described above, the multiple-phase fluid stream does not comprise liquid L. In this embodiment, both the gas channel 423 and the liquid channel 425 are used for directing gas G from the vessel to the fluid outlet 414. The lower opening 421 of the shroud 419 represents the highest level that particulates may be accumulated to. In other words, the desanding device 400 will fail if the accumulated particulates in the vessel reaches the lower opening 421 of the shroud 419. Such a failure is prevented by periodically removing accumulated particulates from the vessel 400.

As appreciated by persons skilled in the art, the desanding devices in the embodiments described above are made of suitable material, such as steel or the like, with specifications satisfying relevant safety code requirement.

The embodiments of the invention for which an exclusive property or privilege is claimed are defined as follows:

1. A vessel for removing at least particulates from a multiple-phase fluid stream containing at least gas and entrained particulates, the vessel comprising:
   a fluid inlet for discharging said fluid stream generally horizontally into the vessel;
   an outlet conduit comprising an intake opening at the bottom of the outlet conduit for receiving a particulate-free, desanded gas stream and a discharge end at the top of the outlet conduit which extends out of the top of the vessel to discharge the desanded gas stream from the vessel; and
   an internal, generally upright spiral plate baffle located below the top of the vessel for receiving the fluid stream from the fluid inlet and directing the fluid stream generally horizontally along an elongated flow path from the fluid inlet to the intake opening of the outlet conduit, the length of said flow path being longer than the direct distance between the fluid inlet and the intake opening of the outlet conduit, the baffle having an open top along the elongated flow path at an elevation above the fluid inlet and an open bottom at an elevation below the fluid inlet wherein the at least particulates fall through the open bottom; wherein
   the intake opening of the outlet conduit being within a central portion the baffle at an elevation below the open top of the baffle wherein the intake opening of the outlet conduit determines a horizontally extending freeboard interface, said freeboard interface separating a freeboard portion formed adjacent an upper portion of the vessel above the interface for collecting the desanded gas stream and an accumulator portion therebelow.

2. The vessel of claim 1 wherein the cross-sectional shape of the baffle is selected from the group consisting of an Archimedean spiral, a Cornu spiral, a Fermat's spiral, a hyperbolic spiral, a lituus, a logarithmic spiral, and a spiral of Theodorus.

3. The vessel of claim 1 wherein the fluid inlet is oriented generally horizontally for directing the fluid stream along the baffle.

4. The vessel of claim 1 wherein the vessel comprises a cylindrical side wall, and the fluid inlet is oriented for directing the fluid stream at a direction tangential to the side wall.

5. The vessel of claim 1 wherein the fluid inlet directs the fluid stream away from a side wall of the vessel.

6. The vessel of claim 1 wherein the fluid inlet is at an elevation above the intake opening of the outlet conduit.

7. The vessel of claim 1 wherein the fluid inlet is at an elevation below the intake opening of the outlet conduit.

8. The vessel of claim 1 further comprising:
   a drain at a lower portion of the vessel for removal of particulates from the vessel.

9. The vessel of claim 8 wherein the lower portion of the vessel comprises at least one inclined side wall for facilitating migration of particulates towards the drain.

10. The vessel of claim 9 wherein the slope of the at least one inclined side wall is about or greater than the angle of repose of a bank of wet particulates.

11. The vessel of claim 8 wherein the drain further comprises:
    an inlet valve adjacent and fluidly connected to the drain;
    a particulate accumulation chamber; and
    a discharge valve, wherein
    the particulate accumulation chamber is sandwiched between the inlet valve and the discharge valve.

12. The vessel of claim 1 wherein the multiple-phase fluid stream further comprises entrained liquid, and wherein the entrained liquids and particulates fall through the open bottom of the baffle.

13. The vessel of claim 12 wherein the horizontally extending freeboard interface is an interface between the gas and the liquid.

14. The vessel of claim 1 wherein the vessel comprises a cylindrical side wall and a flat head.

15. The vessel of claim 1 wherein the vessel comprises a cylindrical side wall and a hemispherical head.

16. The vessel of claim 1 wherein the vessel comprises a cylindrical side wall and a semi-elliptical head.

17. The vessel of claim 1 comprising:

an elongated conduit having an upper opening and a lower opening;

wherein at least a portion of the outlet conduit is within the baffle;

wherein the outlet conduit extends into the upper opening of the elongated conduit, the intake opening of the outlet conduit being in the elongated conduit at an elevation below the upper opening of the elongated conduit.

18. The vessel of claim 17 wherein the elongated conduit comprises a top wall, said top wall comprising an opening sealably receiving the outlet conduit, and wherein the elongated conduit further comprises one or more openings proximate the top wall thereof, forming the upper opening thereof.

19. The vessel of claim 17 wherein the upper opening of the elongated conduit is at an elevation above the top of the baffle.

20. The vessel of claim 17 wherein the upper opening of the elongated conduit is at an elevation below the top of the baffle.

21. The vessel of claim 17 wherein the lower opening of the elongated conduit is at an elevation about the same as the bottom of the baffle.

22. The vessel of claim 17 wherein the lower opening of the elongated conduit is at an elevation above the bottom of the baffle.

* * * * *